United States Patent
Soller

(10) Patent No.: US 6,189,259 B1
(45) Date of Patent: *Feb. 20, 2001

(54) INSECT BAIT-AND-SWITCH DELIVERY APPARATUS

(75) Inventor: Douglas A. Soller, Mount Pleasant, WI (US)

(73) Assignee: S. C. Johnson & Son, Inc., Racine, WI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/332,784

(22) Filed: Jun. 14, 1999

(51) Int. Cl.[7] .................................................. A01M 1/20
(52) U.S. Cl. ........................................ 43/131; 43/132.1
(58) Field of Search ............................ 43/107, 124, 131, 43/132.1

(56) References Cited

U.S. PATENT DOCUMENTS

| | | | |
|---|---|---|---|
| 1,084,647 | * 1/1914 | Libison | 43/107 |
| 2,060,245 | * 11/1936 | Rosefield | 43/131 |
| 2,234,500 | * 3/1941 | Moore | 43/131 |
| 2,568,168 | * 9/1951 | Query | 43/131 |
| 2,635,382 | * 4/1953 | Kuntz | 43/131 |
| 2,781,607 | * 2/1957 | Smiley | 43/131 |
| 3,122,857 | * 3/1964 | Yates | 43/131 |
| 3,124,277 | * 3/1964 | Helland | 43/131 |
| 3,303,599 | * 2/1967 | Ballard | 43/131 |
| 3,324,590 | 6/1967 | Richardson | 43/131 |
| 3,772,820 | * 11/1973 | Bond | 43/131 |
| 3,835,578 | * 9/1974 | Basile | 43/131 |
| 3,940,875 | * 3/1976 | Basile | 43/124 |
| 4,026,064 | * 5/1977 | Baker | 43/131 |
| 4,043,073 | * 8/1977 | Basile | 43/124 |
| 4,160,335 | 7/1979 | Von Kohorn et al. | 43/131 |
| 4,247,042 | 1/1981 | Schimanski et al. | 239/43 |
| 4,452,393 | 6/1984 | Schimanski et al. | 239/57 |
| 4,658,536 | * 4/1987 | Baker | 43/131 |
| 4,662,103 | 5/1987 | Cheng | 43/131 |
| 4,858,374 | 8/1989 | Clemons | 43/122 |
| 5,018,299 | 5/1991 | Peek et al. | 43/107 |
| 5,033,229 | 7/1991 | Demarest et al. | 43/131 |
| 5,152,992 | 10/1992 | Kandathil et al. | 424/405 |
| 5,311,697 | * 5/1994 | Cavanaugh et al. | 43/132.1 |
| 5,339,563 | * 8/1994 | Job | 43/107 |
| 5,392,560 | * 2/1995 | Donahue et al. | 43/107 |
| 5,396,730 | 3/1995 | VanGundy et al. | 43/131 |
| 5,406,743 | 4/1995 | McSherry et al. | 43/122 |
| 5,501,033 | 3/1996 | Wefler | 43/131 |
| 5,522,171 | * 6/1996 | Madeville | 43/107 |
| 5,548,922 | 8/1996 | Wefler | 43/131 |
| 5,557,880 | 9/1996 | Schneidmiller | 43/122 |
| 5,682,706 | * 11/1997 | Altenburg | 43/107 |
| 5,685,109 | 11/1997 | Rimback | 43/122 |
| 5,749,168 | * 5/1998 | Chrysanthis | 43/131 |
| 5,778,596 | * 7/1998 | Henderson et al. | 43/132.1 |
| 5,832,658 | * 11/1998 | Randon | 43/131 |
| 5,842,305 | * 12/1998 | Liao | 43/107 |
| 5,875,586 | * 3/1999 | Ballard et al. | 43/131 |
| 5,943,816 | * 8/1999 | Hyatt et al. | 43/131 |
| 5,950,356 | * 9/1999 | Nimocks | 43/131 |
| 6,058,646 | * 5/2000 | Bishoff et al. | 43/131 |

* cited by examiner

Primary Examiner—Darren W. Ark

(57) ABSTRACT

An insect bait-and-switch liquid delivery apparatus for the control of insects. The apparatus includes a reservoir defining a first chamber containing liquid bait attractive to an insect and a second chamber containing liquid active toxic to an insect, a first feeding station in the first chamber for making liquid bait available to an insect, a second feeding station in the second chamber for making liquid active available to an insect, a passageway interconnecting the first and second chambers, and an access port disposed to initially prevent or limit access of an insect to the second feeding station during an initial feeding period and to subsequently enable access to the second feeding station via the passageway after the initial feeding period. In one embodiment, the access port is located beneath the surface of the liquid bait, and in another embodiment the access port is located above the surface of said liquid bait.

21 Claims, 6 Drawing Sheets

INSECT BAIT-AND-SWITCH DELIVERY APPARATUS

BACKGROUND OF THE INVENTION

The present invention relates to the field of insect control, and more particularly to a bait-and-switch delivery apparatus for the control of insects.

Various traps and other types of insecticide delivery systems have been developed in an attempt to control flying insects with varying degrees of success. Insecticide delivery systems are sometimes categorized as being either of the "quick kill" variety or of a "delayed kill" type.

Quick kill systems use pesticides that kill shortly after contact or ingestion. Quick kill pesticides are usually used in aerosol and spray insecticide systems. Unfortunately, quick kill pesticides are typically only effective on individuals or very small groups of insects, and thus the entire colony of insects cannot be eradicated unless the entire colony is exposed to the quick kill pesticide. Such exposure can rarely be accomplished due to the limitations of dispensing such pesticides.

Pesticides which have a "delayed kill" action are most useful against social insects such as wasps and bees. If a "delayed kill" pesticide is ingested by wasps and bees, the active substance toxic to the insect will be carried back to the home colony where it will be shared by other members such as larvae, workers, and the queen. If sufficient toxicant is transported back into the home colony, it is possible to eradicate the entire colony. In order to assure that sufficient toxicant is carried back to the nest or home colony, the formulation containing the active toxicant must be palatable to the insect.

Wasps, which include such species as yellow jackets and hornets, are generally categorized as feeding source generalists. However, wasps are quite sensitive to the presence of adulterants in food. Thus, palatable toxicant formulations must be carefully prepared so that the levels of toxicants, surfactants and other substances are carefully blended to provide an attractive bait. However, degradation of the toxicant often times results in bait which, although initially attractive, ultimately becomes unpalatable.

An approach to getting wasps such as yellow jackets and hornets to ingest a toxicant that has been found very effective has been called the "bait-and-switch" technique. This technique essentially allows the wasps to become accustomed to a liquid food source containing no toxicants, i.e. a liquid formulated with bait only which is attractive to the insect during an initial feeding period. As a result, these insects are baited or trained to continue feeding from what they consider to be a palatable formulation even after a toxicant is added to the formulation. For such a method to be convenient and effective, a specialized delivery system needs to be employed.

SUMMARY OF THE INVENTION

The present invention provides an insect bait-and-switch delivery apparatus for the control of flying insects, especially wasps. The invention provides an economical and easily manufactured apparatus that delivers both a bait and an active substance toxic to the insects in such a way as to provide a very effective bait-and-switch apparatus to kill targeted insects. In particular, the apparatus trains wasps to become accustomed to a liquid food source containing no toxicants, i.e. a bait only formulation, so that, after an initial feeding period, they subsequently continue feeding from the source, even after a toxicant is added to the formulation exposed for feeding. Once the delivery apparatus is activated, the formulation having the active ingredient is made available for feeding without any further specific positive action by the end user or consumer who purchases the apparatus.

The apparatus has a reservoir defining a first chamber containing bait attractive to an insect, and a second chamber containing active toxic to an insect, a first feeding station in the first chamber for making bait available to an insect, a second feeding station in the second chamber for making active available to an insect, a passageway interconnecting the first and second chambers, and access means in the first chamber disposed to initially limit access of an insect to the second feeding station during an initial feeding period of bait and to subsequently enable access to the second feeding station via the passageway after the initial feeding period and depletion of the bait. Thus, the apparatus initially prevents or at least limits insect access to the active during an initial feeding period, but after the initial feeding period, enables the insects to have access to a bait-active mixture. In this manner, the insect is initially trained to become accustomed to a food source, and thereafter to continue feeding from a bait-toxicant mixture. Thus, as the insects travel back and forth from the apparatus to their nest, the active toxin is spread throughout the entire nest to exterminate all members of the nest without the time consuming necessity of actually physically locating the nest or the relatively dangerous activity of directly spraying the nest with a quick kill insecticide.

In order to accomplish the above, one embodiment of the apparatus has the chamber containing the active located above the chamber containing the bait, and a central tubular core comprising the passageway interconnecting the two chambers. The access means comprises a plurality of ports located at the bottom of the tubular core. These ports are initially beneath the surface of the bait and therefore, covered by the bait contained in the lower chamber. Thus, wasps, although having access to the feeding station dispensing the bait, do not have access to the feeding station containing the active. Thus, as the bait is depleted due to the feeding action of insects at the feeding station, the level of bait slowly moves downwardly toward the bottom of the reservoir. Eventually, as the level of the bait in the lower chamber continues to decrease, the bait uncovers the lower end of the central tubular core, and thus uncovers the access ports. Once the access ports are uncovered, the insects travel through the access ports up the central tubular core to the upper chamber and its bait-active mixture. Thereafter, as the insects continue to feed, they ingest the combination active and bait mixture. Thus, as the insects travel back and forth from the apparatus to their nest, the active is spread throughout all the insects in the colony resulting in eradication of the entire insect colony.

In another embodiment, the chamber containing the active is located below the chamber containing the bait, and a central tubular core comprising the passageway again interconnects the two chambers. The access means comprises an opening of reduced dimensions located at the upper end of the core which, in this embodiment, extends substantially above the feeding station dispensing the bait. Thus, wasps feed on the readily available bait until it is depleted and then discover the less directly presented access port above the feeding station, whereupon they travel down the central cover to feed on the active in the lower chamber.

DESCRIPTION OF THE PREFERRED EMBODIMENT

Figure 1:
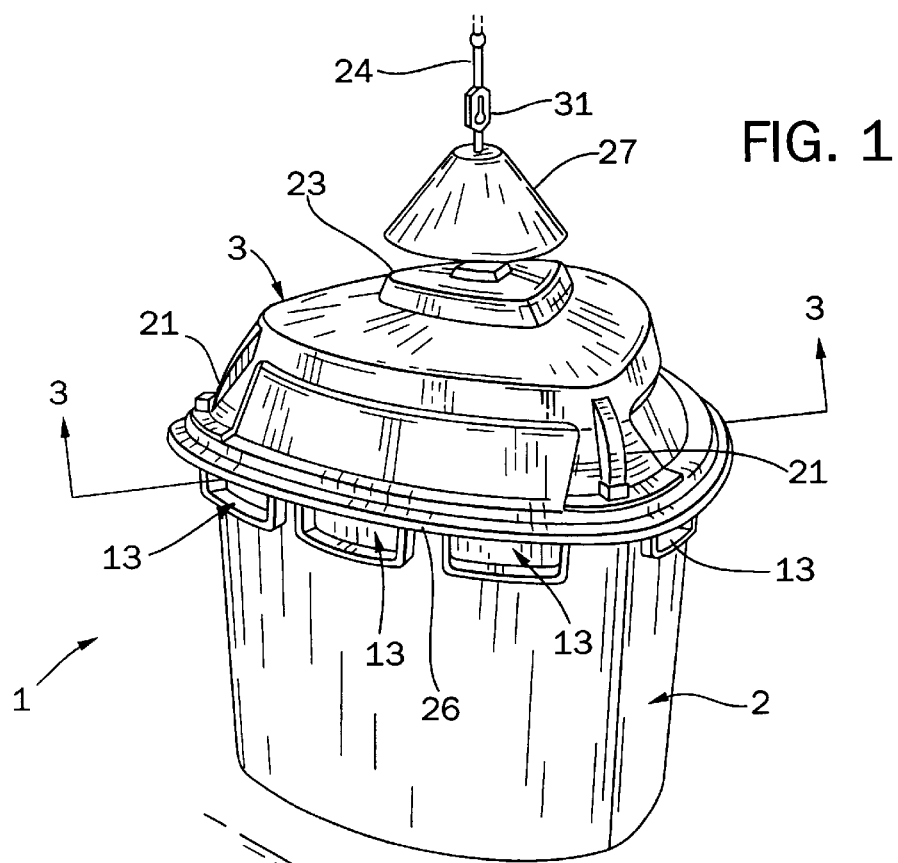
FIG. 1 is a perspective view of a first embodiment of an insect bait-and-switch delivery apparatus constructed in accordance with the present invention.

The term "bait" is defined to mean preparations that are attractive to a target insect as a food source. Unless another meaning is clear from the context, the word "bait," when used by itself, shall be understood herein as referring to such a food source substantially free of insecticide or other active ingredient, as defined below. The terms "active" and "active ingredient," as used herein refer to pest control ingredients. Pest control ingredients preferably are insecticides but may also include insect growth regulators or other growth or behavior modifying agents well known in the art. All such ingredients will be referred to herein as "toxic," without further distinction made between the types of control they exert. When used in the insect bait-and-switch delivery apparatus of the invention, actives preferably are mixed with food sources or other bait materials to induce insects to ingest the actives. Reference to a "liquid active," for example, should be understood as referring to a liquid containing an active and such bait or other additional materials as may be useful to induce feeding or achieve other desirable effects.

The preferred bait form for use in the embodiments of the invention disclosed herein is a liquid bait, and the preferred embodiments described are particularly suited for use with a liquid bait. However, other physical forms are possible for baits, such as gels, solids, powders, semisolids, or other baits. While baits will generally be referred to herein as liquid, the disclosure should be understood as including by implication the other physical forms, as well, with any necessary structural modifications to the delivery apparatus that would be apparent to one skilled in the art as appropriate to the alternative bait physical form. For example, while the liquid baits disclosed in the preferred embodiments are described as being used with wicks and other structures capable of transferring liquid bait to a feeding station via capillary action, the exposed surface of a gel or solid 10 bait will be understood as an alternative embodiment not requiring wicks or capillary transfer. Instead, the exposed surface of a gel or solid bait can itself serve as a feeding station, and access ports and the like, as described below, can be exposed by the direct consumption of such a bait.

Referring now to the drawings, there is illustrated an insect bait-and-switch delivery apparatus for the control of flying insects, preferably wasps such as yellowjackets and hornets. It should be noted, however, that although the specification specifically refers to wasps as a common target insect for which the particular embodiments shown are especially suited, the invention is applicable to all types of "social" insects such as ants, termites, wasps, yellowjackets, hornets and bees. Only minor modifications need be made to the basic concept of the present invention to provide an apparatus that is adapted for crawling social insects such as ants and termites rather than the flying social insects in which the present specification is specifically directed. Therefore, the following apparatus may be useful to control all types of insects that can easily assimilate food when it is in a solid, powder, gel, semisolid, liquid or liquifiable form. Likewise, although a specific bait formulation and specific active formulation may be described herein, these formulations can readily be modified and adapted to a particular target insect. Thus, the apparatus described herein may be useful with a myriad of different bait as well as active formulations.

Figure 2:
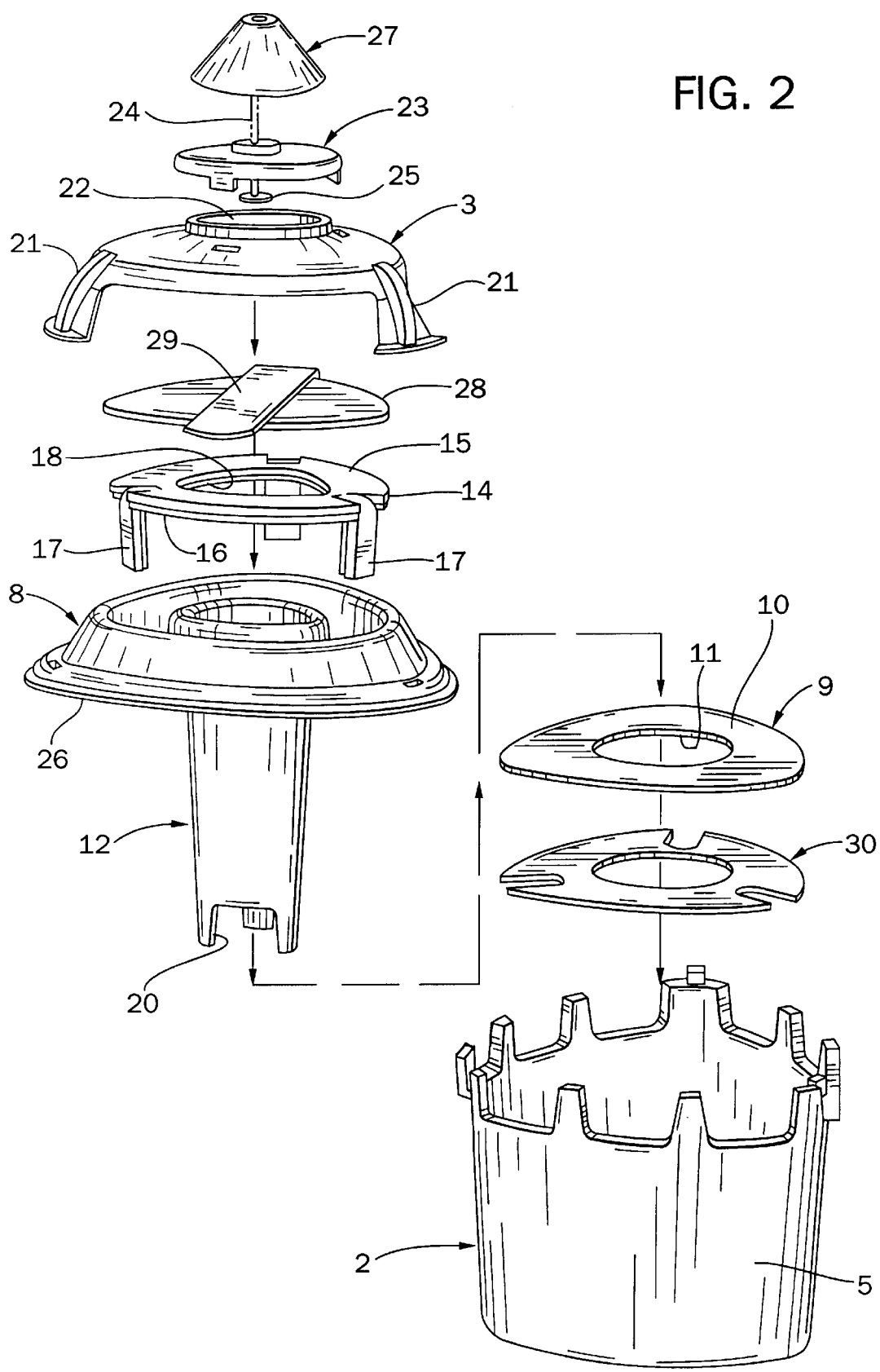
FIG. 2 is an exploded perspective view of the components of the apparatus of FIG. 1.

Referring now to FIGS. 1–7, there is illustrated a first embodiment of an insect bait-and-switch delivery apparatus generally designated by the numeral 1 which includes two main components, i.e. an open top container or reservoir 2 containing most of the individual components of the apparatus, and a cover 3. Referring first to container 2, FIGS. 1 and 2 show that it is preferably triangular in shape having a bottom wall 4 and upstanding side walls 5. Although illustrated as triangular, container 2 may also be substantially cylindrical in shape as well as other shapes as its dimensions are not particularly critical other than possibly its height. Container 2 is preferably formed of a semi-transparent plastic material such as high density polyethylene which enables an end user to physically see the levels of the bait and active formulations contained therein.

Container 2 defines a lower internal chamber 6 containing bait attractive to an insect, and supports a tray 8 defining a second internal annular upper chamber 7 containing active toxic to an insect. As seen best in FIG. 3, tray 8 is supported by the upper peripheral edges of container 2 so as to substantially enclose the open top of container 2. Lower chamber 6 initially contains a liquid bait formulated substantially free of any insect-toxic substances and including a composition that is attractive to the target insects. The optimal liquid bait preparation contains 10% to 20% corn syrup, 5% to 15% sucrose, 0.5% to 5.% maltodextrine, 1% to 10% of a protein, and 0.001% to 0.02% of a preservative, with the balance of the composition being water. Although this liquid bait composition is preferred, it is clear that other compositions may be utilized depending upon the target insect. For example, liquids may be oils or oil and water emulsions. Food ingredients can include amino acids, vitamins, salts, and trace elements. The bait may also be in solid, powder, gel, semisolid or other liquifiable form.

Figure 5:
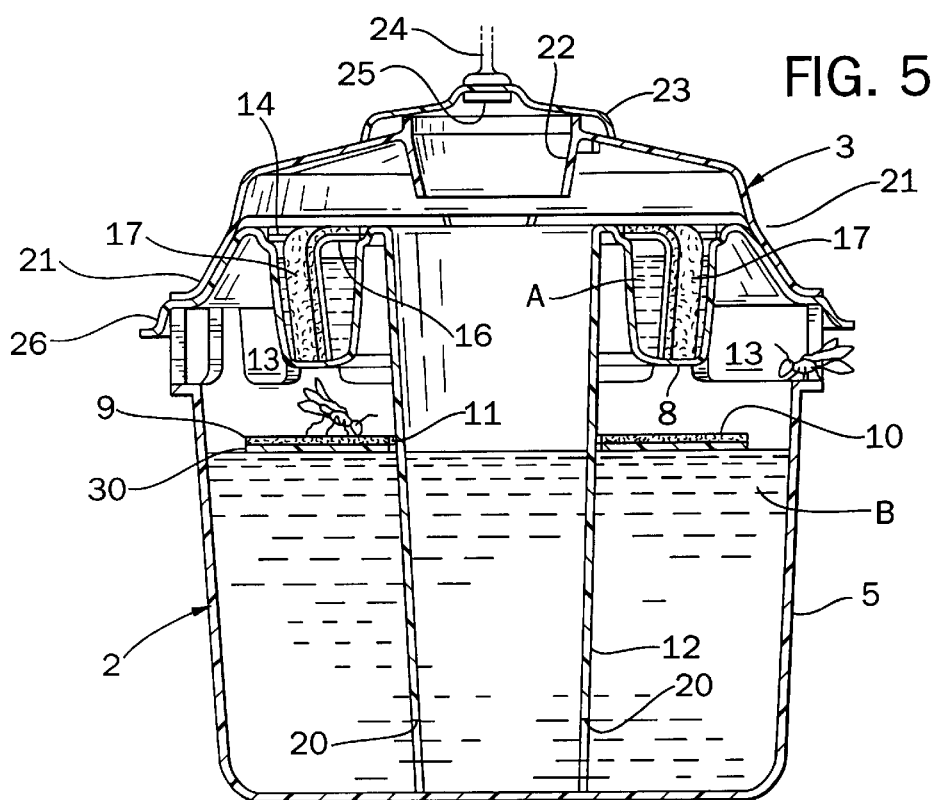
FIG. 5 is a cross-sectional view corresponding to that of FIG. 3 illustrating the initial baiting stage of the apparatus.

As shown best in FIG. 5, a first feeding station is located within lower chamber 6, and floats on the liquid bait for making the liquid bait available to an insect. The first feeding station comprises an absorbent feeding pad 9, preferably made of a cellulose material. Pad 9 could also be comprised of a porous mat, or preferably a plastic, nonporous material with a plurality of holes therethrough. The composition of pad 9 insures that the liquid bait contained within chamber 6 substantially impregnates pad 9. Thus, liquid from chamber 6 moves upwardly by capillary action and impregnates feeding pad 9. Pad 9 is triangular-shaped to substantially match the shape of container 2, and provides a flat feeding surface 10. The outer dimensions of pad 9 substantially conform to the inner dimensions of container 2, but are slightly less to ensure that pad 9 freely floats on the liquid bait B in chamber 6. Pad 9 also includes a central opening 11 having an inner diameter slightly greater than the outer diameter of central tubular core 12 to ensure pad 9 does not hang-up on or "stick" on core 11. To insure pad 9 remains substantially planar in shape, pad 9 is mounted to a flat, buoyant, plastic disc 30 having radially extending slots to insure liquid bait B contacts pad 9. As also shown best in FIG. 5, the side walls 5 of container 2 include a plurality of circumferentially spaced access ports 13 which allow insects to reach the interior of container 2 and feed from the upper flat feeding surface 10 of absorbent feeding pad 9. As the wasps feed on the liquid impregnated pad 10, liquid bait is continuously drawn from chamber 6 upwardly into pad 9 to replenish what is lost from this feeding as well as evaporation. Thus, as the wasps feed, the level of liquid within lower chamber 6 slowly lowers, as does pad 9.

Upper chamber 7 contains liquid active A toxic to an insect, and further includes a fixed absorbent feeding pad 14. Pad 14 is preferably made of the same composition as pad 9 and provides a flat feeding surface 15 defining a second feeding station. Pad 14 also includes a plurality of depending wicks 17 integral with pad 14 to ensure that the liquid active contained within chamber 7 substantially impregnates pad 14. A support 16 comprising a flat plate disposed beneath pad 14 and integral legs disposed along the inside of wicks 17 is used to maintain and support pad 14 and wicks 17 in their fixed positions. Thus, liquid from chamber 7 moves upwardly by capillary action via wicks 17 and impregnates the feeding pad 14. Pad 14 also includes a central opening 18 to enable tubular core 12 to pass therethrough. Thus, pad 14 in combination with legs 16 and wicks 17 form a feeding station in chamber 7 for making liquid active available to a flying insect such as a wasp.

Figure 3:
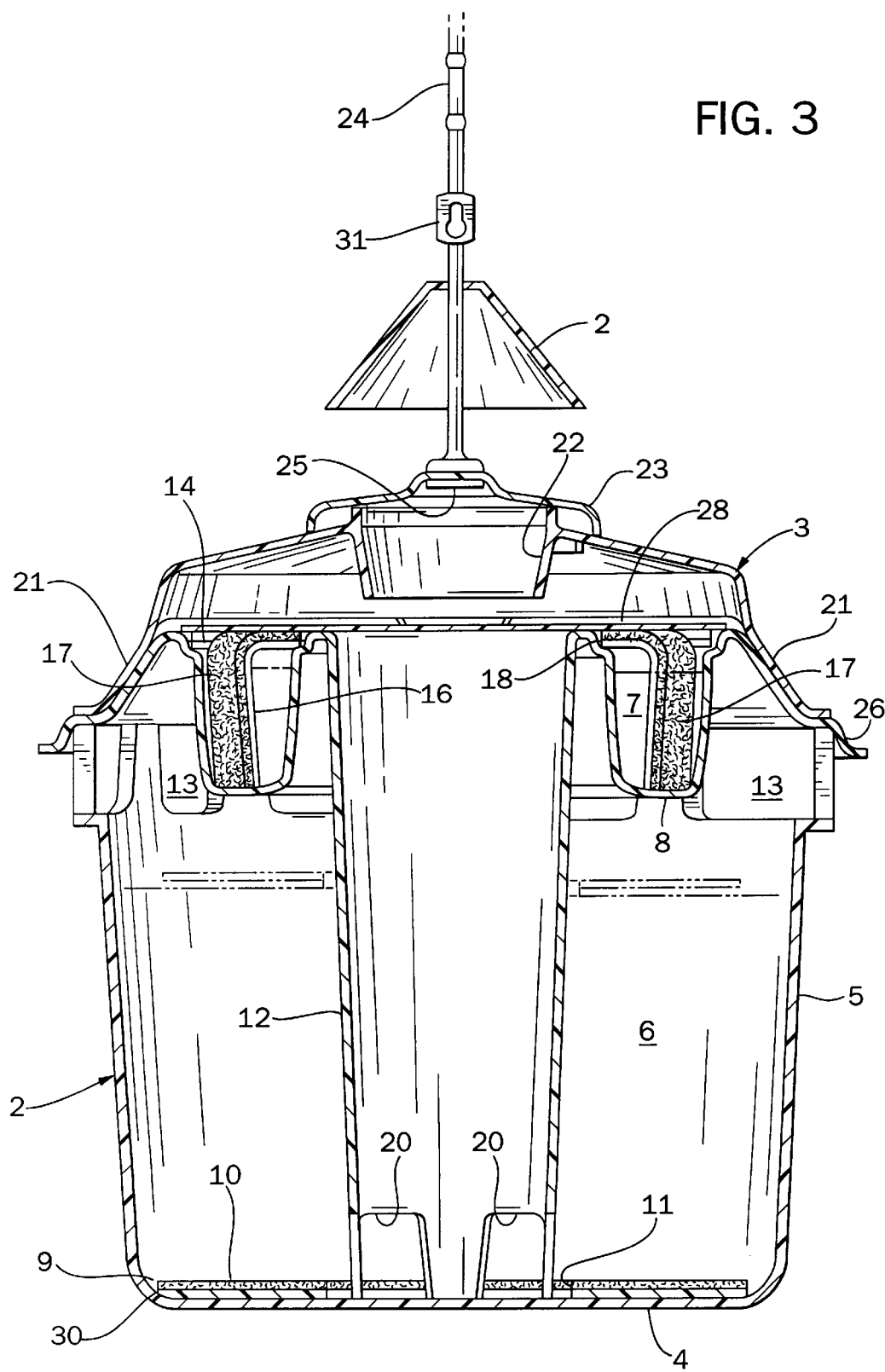
FIG. 3 is a cross-sectional view taken along the line 3—3 in FIG. 1.
Figure 6:
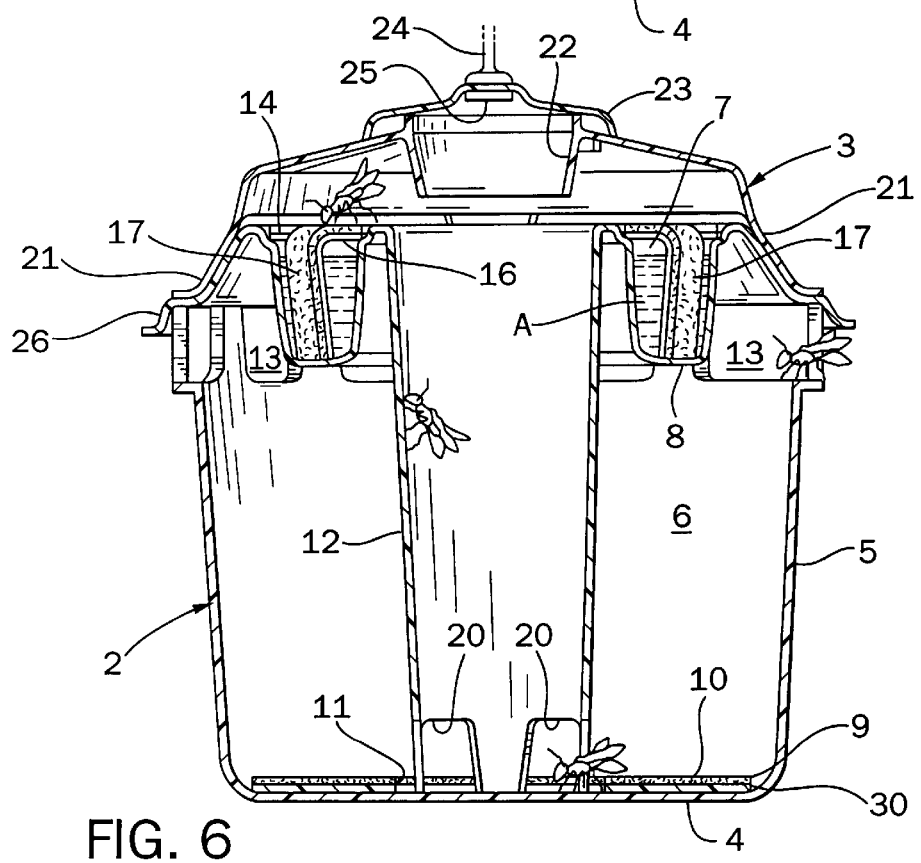
FIG. 6 is a cross-sectional view corresponding to that of FIG. 5 illustrating the subsequent switching of the apparatus to deliver active.

Tray 8 includes an integral central tubular core 12 having an upwardly diverging inner diameter of sufficient dimension throughout its length to enable a flying insect such as a wasp to fly therethrough between chamber 6 and chamber 7. Core 12 is supported by bottom wall 4 and extends upwardly therefrom through central opening 11 in pad 9, and finally through central opening 18 in pad 14. As shown best in FIG. 3, the upper open end of core 12 is substantially flush with fixed feeding pad 14. Also, as best shown in FIGS. 3 and 6, central core 12 includes a plurality of access ports 20 formed at the bottom of core 12. Access ports 20 are of sufficient dimensions to enable a flying insect to pass therethrough and into core 12, as illustrated in FIG. 6. Thus, core 12 provides a passageway interconnecting upper chamber 7 with lower chamber 6. As shown best in FIG. 5, access ports 20 are initially disposed beneath the surface of the liquid bait in lower chamber 6 and are thus inaccessible during an initial feeding period. It is not until the level of liquid in lower chamber 6 drops or is depleted to the point where the level of liquid bait is beneath the upper edges of access ports 20 that the insects are allowed access to the interior of core 12 and hence to feeding pad 14, as will hereinafter be described.

The final component of apparatus 1 is cover 3. Cover 3 is dome-shaped and includes three lower legs 21 which are formed to snap fit into flange 26 of tray 8 and thereby enclose tray 8. A central opening 22 is formed in a cap 23 to enable a string, wire, cable or the like 24 to extend therethrough. The lower end of string 24 includes a stop 25 to prevent string 24 from passing completely through opening 22 while the upper end of string 24 passes through a locking member 31 to form a loop which is used to hang apparatus 1 in a location known to frequented by wasps, which are the preferred target insects. A Teflon-coated ant-resistant shield 27 is mounted to string 24 to prevent ants from depleting apparatus 1.

Cap 23 is removable from cover 3, and is snap-fit in place directly above the upper opening of tubular core 12. Since lower chamber 6 may contain as much as a liter or more of liquid bait, this makes for too much weight to economically ship station 1. Therefore, for shipping purposes, a liquifiable dry bait is preferred. Consequently, cap 23, when removed, allows a user to pour water directly down central core 12 and into lower chamber 6. Since it is intended that apparatus 1 be shipped with dry bait ingredients B in lower chamber 6, an end user pours water W through the opening provided by cap 23, and directly down central core 12 into lower chamber 6 (See FIG. 4). The end user then gives the apparatus 1 a swirl to thoroughly dissolve and mix the dry bait with water thus creating the liquid bait in lower chamber 6.

Again, for shipping purposes, a protective seal 28 is placed across the open top of tray 8 and above feeding surface 15 of upper absorbent feeding pad 14. Seal 28 provides a seal for upper chamber 7 and extends between the inner and outer edges of tray 8 and to the upper edges of central core 12. Seal 28 avoids loss of the active-bait liquid A contained in the annular upper changer 7 of tray 8 during shipping and also makes sure that the water W being poured into lower chamber 6 does not splash into upper chamber 7. Seal 28 has a pull tab 29 that is accessible through a slot (not shown) formed in cover 3. An end user removes seal 28 by using pull tab 28 to extract seal 28 through the slot 30 in cover 3 just prior to activation of apparatus 1.

The upper chamber 7 of tray 8 contains a liquid A formulated with an active substance toxic to the insect, sometimes referred to herein as the "liquid active". The preferred active or toxicant is an effective concentration of a hemisalt preparation of perfluoroalkane sulfonic acid. A sufficient amount of the active is used so that a concentration of 0.001% to 1.5% by weight, preferably 0.02% to 0.03%, by weight of the active is supplied when the active is admixed with the liquid bait, as will hereinafter be described. The hemisalt preparation,. being a partially neutralized preparation of perfluoroalkane sulfonic acid, is not very acidic, has sufficient water solubility and produces a toxicant attractant formulation that is very attractive to wasps. The hemisalt preparation is also stable in carbohydrate solutions, the preferred insect attracting ingredient for such insects. The hemisalt of perfluoroalkane sulfonic acids can be made by mixing an aqueous solution of a base with an aqueous solution of the acid to prepare an aqueous formulation having a pH between 2.8 and 6.5, preferably a pH of 4.0 to 6.5, and most preferably a pH of 5.0 to 6.0 with an optimal pH of 5.5. The base used to neutralize the sulfonic acid is selected from the group consisting of hydroxides of sodium, potassium, lithium, calcium, magnesium, zinc, aluminum or zirconium; ammonium hydroxide; primary, secondary, or tertiary amines; primary, secondary or tertiary alkanolamines; or tetra alkylammonium hydroxides, wherein the alkyl is preferably methyl, ethyl, propyl, or butyl. Although the above hemisalt preparation is preferred, other toxicants such as sulfluramid, abamectin and hydramethylnon may also be utilized.

Figure 4:
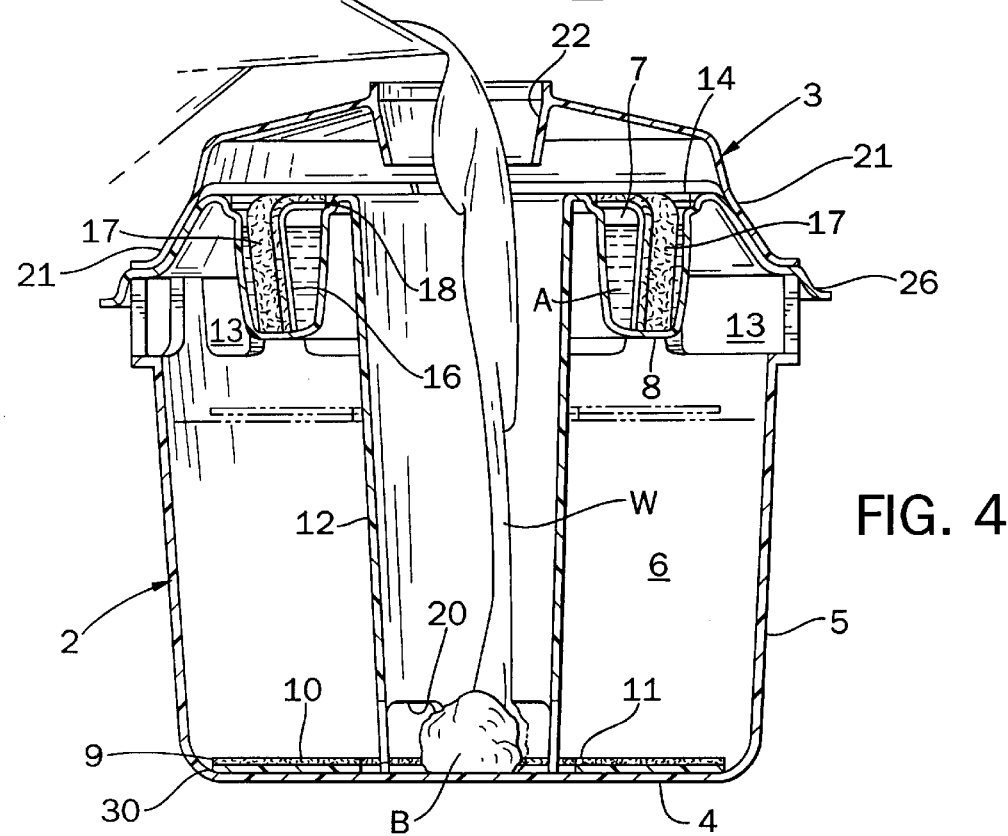
FIG. 4 is a cross-sectional view corresponding to that of FIG. 3, with the cap removed to allow water to be added to the bait chamber of the apparatus of FIG. 1.

Referring now to FIGS. 4–6, the operation of apparatus 1 can be described as follows. First, cap 23 is removed from cover 3, and water W is poured down central core 12 into lower chamber 6 to form an aqueous solution with bait B. Cap 23 is then replaced, and seal 28 is removed from upper chamber 7. Apparatus 1 is hung from a tree branch or the like via string 24. The insects, preferably wasps, feed on the liquid bait in lower chamber 6 (See FIG. 5) until the level of liquid in chamber 6 is depleted to the point where access ports 20 are revealed (See FIG. 6). Once revealed, the wasps can gain access to upper chamber 7 via core 12. In this manner, the insect is initially trained to become accustomed to a palatable liquid food source, and switched thereafter to continue feeding from a source that is a mixture of toxicant and bait. Thus, as the insects travel back and forth from apparatus 1 to their nest, the active toxin is spread throughout the entire nest to exterminate all members of the nest and thereby eliminate the entire insect colony. Thus, apparatus 1 provides a classic case of "bait-and-switch" whereby it establishes an initial feeding pattern of liquid bait prior to subsequent exposure to liquid active.

Figure 7:
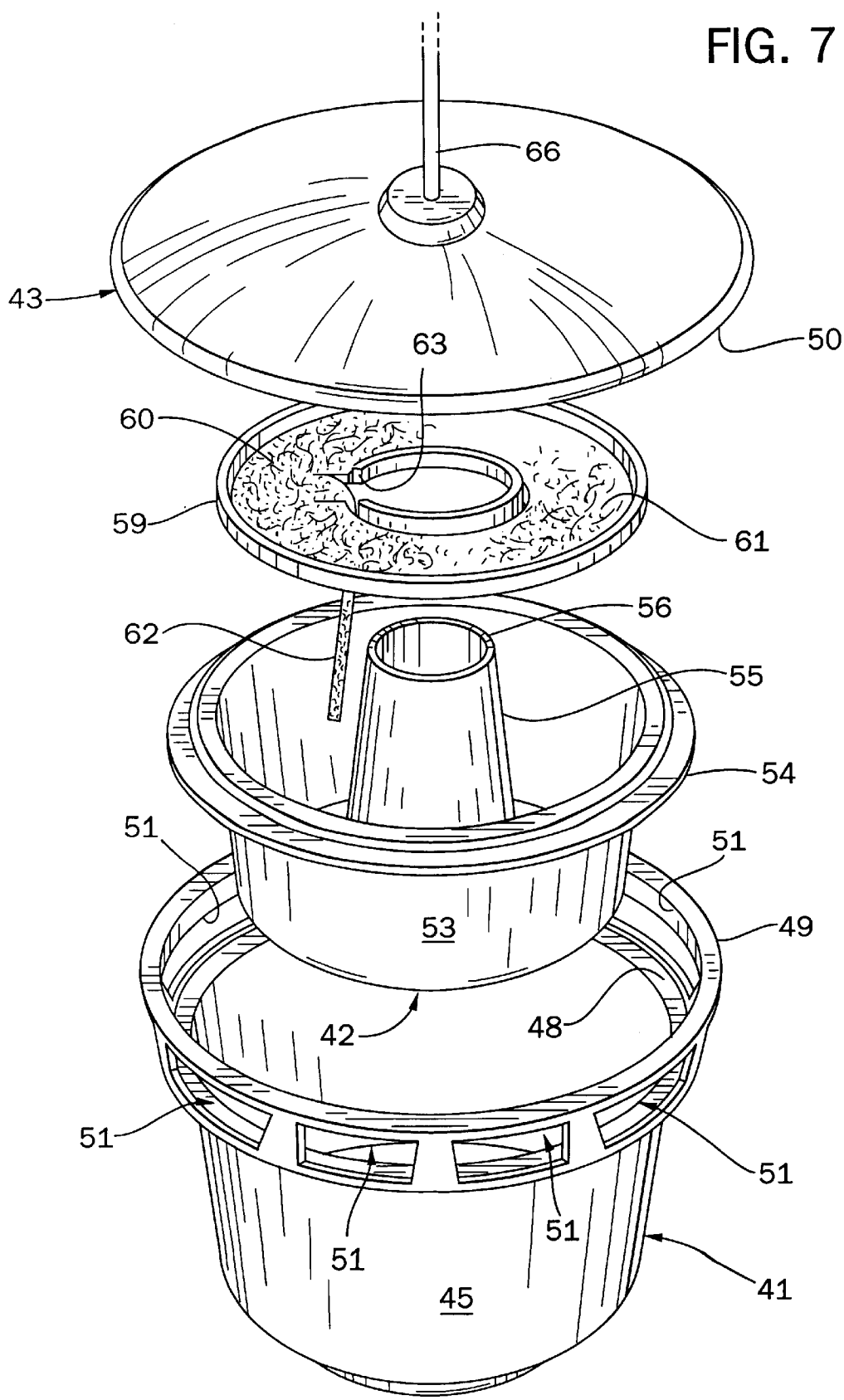
FIG. 7 is an exploded perspective view illustrating the manner of assembling the main components of a second embodiment.
Figure 8:
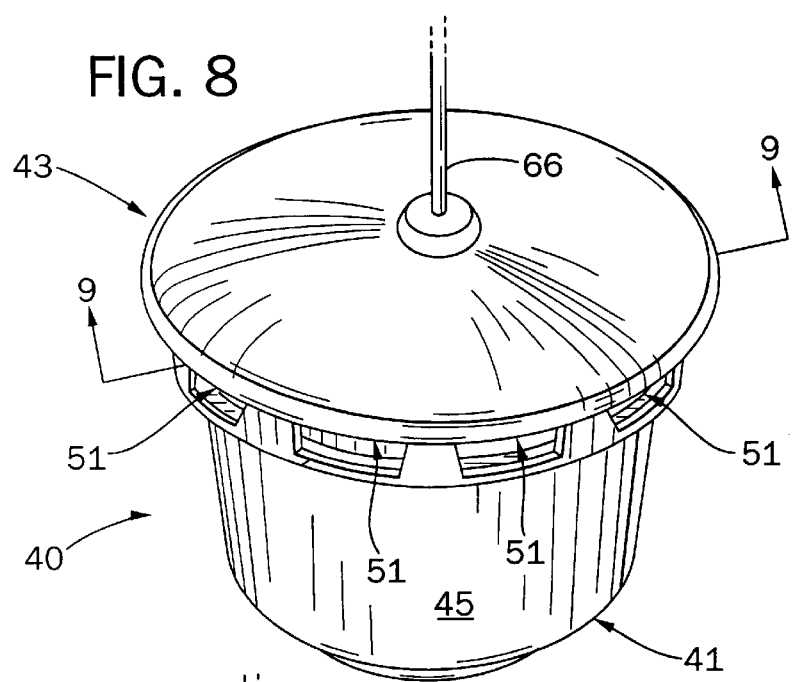
FIG. 8 is a perspective view of the second embodiment of an insect bait-and-switch delivery apparatus constructed in accordance with the present invention.
Figure 9:
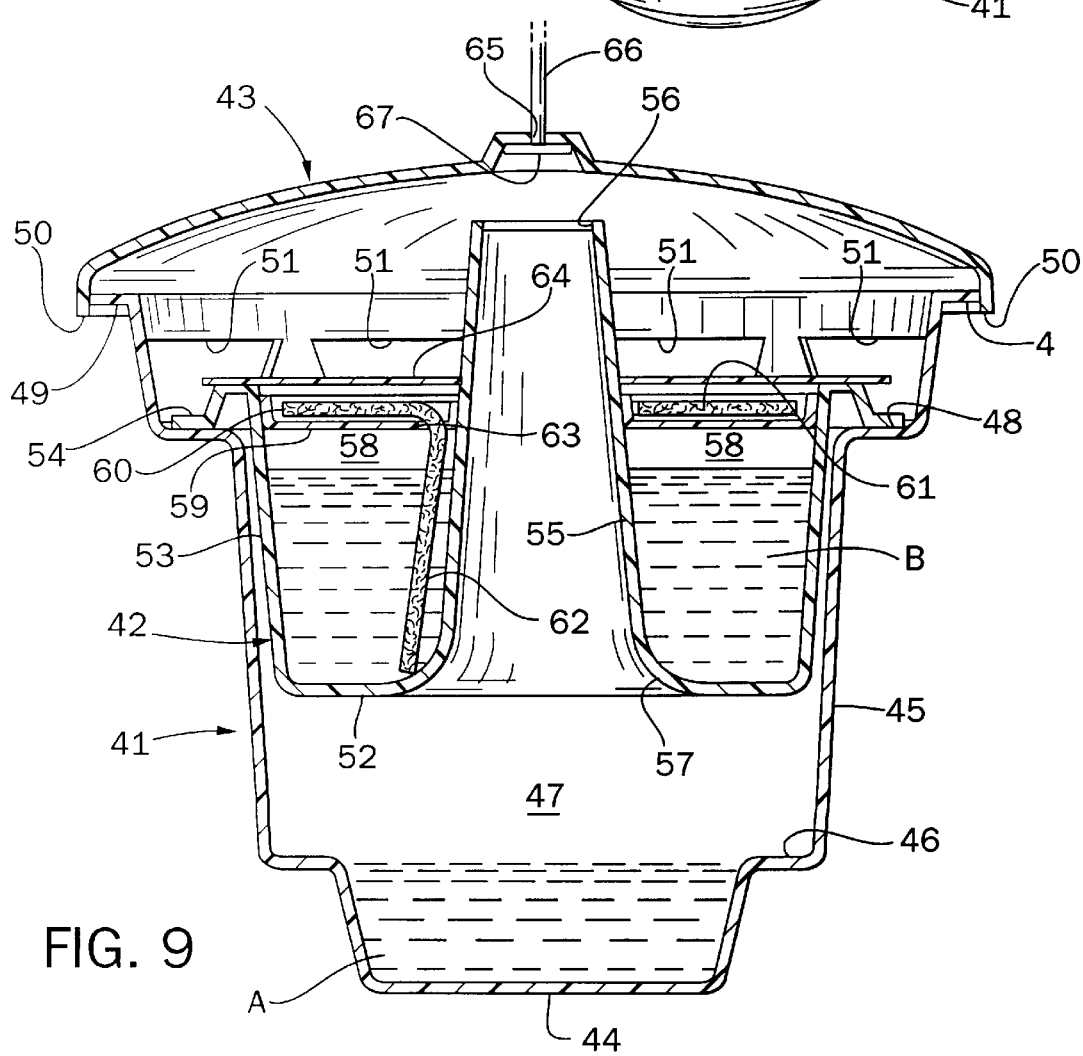
FIG. 9 is a cross-sectional view, taken along the line 9—9 in FIG. 8.

Referring now to FIGS. 7–9, there is illustrated a second embodiment of the insect bait-and-switch delivery apparatus of the present invention, generally designated by the numeral 40. Apparatus 40 includes three main components, namely, an outer container 41, an inner container 42, and a cover 43. Outer container 41 includes a bottom wall 44 and a double stepped cylindrically-shaped upright side wall 45. As seen best in FIG. 9, side wall 45 includes an annular inwardly projecting lower step 46 which provides a ledge or feeding station for the insects, and together with bottom wall 44 defines a lower chamber 47 for containing liquid active A attractive to an insect. The upper end of side wall 45 includes an outwardly projecting upper step 48 which is used to mount and support inner container 42. At the upper or open end of container 41, there is an annular outwardly projecting flange or lip 49. Lip 49 cooperates with lower edge 50 of cover 43 to provide a snap fit for cover 43. A plurality of access ports 51 are formed through the upper end of side wall 45 at a location between upper step 48 and lip 49. Access ports 51 allow insects such as wasps access to the interior of container 41. As shown, access ports 51 are spaced circumferentially apart from one another, and are dimensioned to provide sufficient area to enable ingress and egress of the target insect.

Inner container 42 includes a bottom wall 52 and a cylindricallyshaped outer wall 53. Inner container 42 thus defines a second annular upper chamber 58 contained liquid bait B attractive to an insect. An annular flange or lip 54 projecting outwardly from the open upper end of container 42 engages upper step 48 so that inner container 42 is supported or nested within outer container 41. Inner container 42 also includes a downwardly diverging central tubular core 55 which extends between cover 43 and the interior of container 41. Tubular core 55 is open at its upper end 56 as well as at its lower end 57 to provide a passageway between inner container 42 and outer container 41 for the target insects. Thus, core 55 provides a passageway interconnecting upper chamber 58 with lower chamber 47 to enable ingress and egress of the target insect therebetween, as will hereinafter be described. Core 55 also forms the inner wall for annular chamber 58 as seen best in FIG. 9.

As also shown best in FIG. 9, upper end 56 of core 55 has a reduced diameter which is less than the diameter at lower end 57. The smaller diameter at upper end 56 inhibits initial access of an insect to lower chamber 47 since it is desired that the insects feed on liquid bait B in upper chamber 58 for an initial feeding period. However, when the liquid bait B is depleted, the wasps will find the open upper end 56 of core 55 and travel through core 55 to the liquid active A in lower chamber 47. After feeding on liquid active A, these insects will then return upwardly through core 55, out upper end 56 and through access ports 51 to return to their nest.

A feeding station is also located in upper chamber 58 at the upper end of inner container 42. The feeding station comprises a shallow cup-shaped base 59 which supports an absorbent feeding pad 60. Pad 60 is preferably composed of a cellulose material, and provides a flat planar feeding surface 61 for the target insects. A wick 62 is integral with pad 60 and projects downwardly through an opening 63 in base 59 into the liquid bait B contained within upper chamber 58. Wick 62 functions in its conventional manner to draw liquid bait B from chamber 58 upwardly via capillary action to substantially impregnate pad 60 with the liquid bait.

A protective seal 64 is attached to lip 54 and functions to prevent loss of liquid bait B during shipping. Protective seal 64 thus needs to be removed and discarded prior to activation of apparatus 40. This is performed by the end user prior to inserting inner container 42 within outer container 41, and prior to fitting cover 43 on container 41. Liquid active A may also be sealed within container 41, if desired, by a similar seal attatched to lower step 48 to enclose lower chamber 47. If such a seal is mployed, it would need to be removed prior to inserting inner container 42 within outer container 41. Alternately, a small bottle filled with liquid active may accompany apparatus 40 which can be opened and poured into lower chamber 47 just prior to activating or assembling apparatus 40.

Cover 43 also includes a central opening 65 through which a string, wire, cable or the like 66 passes. A stop 67 is attached to the lower end of string 66 to prevent string 66 from passing through opening 65, and a hanger (not shown) is located at the opposite end of string 66 to enable hanging of apparatus 40 in a location where the target insect is known to feed.

In operation, apparatus 40 is first assembled by unsealing the liquid active A in chamber 47 (or filling chamber 47 with liquid active A) and then removing the seal 64 from inner container 42, and placing inner container 42 within outer container 41. Cover 43 is then snap fit over lip 49 and apparatus 40 is hung in an appropriate location. The target insect then gains access to the interior of the apparatus via ports 51 and ingests liquid bait B from pad 60. Eventually, as feeding continues, the level of liquid bait B is depleted so that pad 60 no longer contains a food source. At this time, however, since the target insect has been trained to return to apparatus 40 for feeding, the insects search for an additional food source which they locate by passing through the upper open end 56 of core 55 and then down through core 55 into lower chamber 47. In lower chamber 47 the target insects begin ingesting the liquid active A contained therein. After feeding, the insects return upwardly through core 55 and out the open upper end 56 and ports 51 to their nest. Eventually, sufficient toxin is shared by all the members in the nest so that the entire colony is eradicated.

I claim:

1. An insect bait-and-switch delivery apparatus for the control of insects, comprising:

a reservoir defining a first chamber containing bait attractive to an insect and a second chamber containing active toxic to an insect, said second chamber disposed above said first chamber;

a first feeding station in said first chamber for making bait available to an insect; a second feeding station in said second chamber for making active available to an insect;

a passageway interconnecting said first and second chambers; and access means in said first chamber, said access means communicating with said passageway and disposed below a topmost level of the bait in said first chamber so as to be inaccessible to an insect to thereby initially limit access of an insect to said second feeding station during an initial feeding period and upon feeding an insect depletes said bait to expose said access means to subsequently enable access to said second feeding station via said passageway after said initial feeding period.

2. The apparatus of claim 1 wherein the bait is selected from the group consisting of a liquid a gel, a solid, a powder, and a semisolid.

3. The apparatus of claim 1 wherein said access means comprises at least one port communicating between said first chamber and said passageway.

4. An insect bait-and-switch delivery apparatus for the control of insects, comprising:

a reservoir defining a first chamber containing bait attractive to an insect and a second chamber containing active toxic to an insect said second chamber disposed above said first chamber;

a first feeding station in said first chamber for making bait available to an insect;

a second feeding station in said second chamber for making active available to an insect;

a passageway interconnecting said first and second chambers; and said second feeding station during an initial feeding period and to subsequently enable access to said second feeding station via said passageway after said initial feeding period wherein said access means comprises at least one port communicating between said first chamber and said passageway, and wherein the bait is selected from the group consisting of a liquid, a gel, a solid, a powder, and a semisolid, and said at least one port is located beneath a topmost level of the bait in said first chamber so as to be inaccessible to an insect during said initial feeding period and upon feeding an insect depletes said bait to expose said at least one port.

5. An insect bait-and-switch delivery apparatus for the control of insects, comprising:

a reservoir defining a first chamber and a second chamber, said second chamber disposed above said first chamber a first feeding station in said first chamber, a second feeding station in said second chamber, an access port in said reservoir permitting a target insect ingress to and egress from said first chamber;

a core member interconnecting said first and second chambers, said core member defining a passageway through which a target insect can move and including a first end having at least one port opening into said first chamber and a second end opening into said second chamber;

a bait food source for said target insect lacking a substance toxic to said target insect and disposed in said first chamber at a level which initially covers said at least one port in the first end of said core member to prohibit access of the target insect to said passageway, and upon feeding the target insect depletes said bait until said at least one port in the first end of said core member is exposed to permit the target insect access to said passageway; and an active food source for said target insect disposed in said second chamber and containing a substance toxic to said target insect.

6. The apparatus of claim 5 wherein said bait is selected from the group consisting of a liquid, a gel, a solid, a powder, and a semisolid.

7. The apparatus of claim 5 wherein said bait is a liquid and said first feeding station floats on the liquid bait.

8. The apparatus of claim 5 wherein said core member comprises a centrally located, hollow tube.

9. An insect bait-and-switch delivery apparatus for the control of insects, comprising:

a reservoir defining a first chamber containing bait attractive to an insect and a second chamber containing active toxic to an insect, said first chamber disposed above said second chamber;

a first feeding station in said first chamber for making bait available to an insect;

a second feeding station in said second chamber for making active available to an insect;

an access port in said reservoir permitting a target insect ingress to and egress from said first chamber and said first feeding station;

a core member interconnecting said first and second chambers, said core member comprises a hollow tube defining a passageway through which a target insect can move, and including a first end opening into said first chamber at a location above said first feeding station and a second end opening into said second chamber.

10. The apparatus of claim 9 wherein said core member is centrally located.

11. The apparatus of claim 10 wherein said core member is conically shaped with said first end having a diameter less than said second end.

12. An insect bait-and-switch delivery apparatus for the control of insects, comprising:

a reservoir defining a first chamber containing bait attractive to an insect and a second chamber containing active toxic to an insect;

a first feeding station in said first chamber for making bait available to an insect;

a second feeding station in said second chamber for making active available to an insect;

a passageway interconnecting said first and second chambers; and access means in said first chamber disposed to initially limit access of an insect to said second feeding station during an initial feeding period and to subsequently enable access to said second feeding station via said passageway after said initial feeding period, and wherein the bait is a liquid and said first feeding station floats on the liquid bait.

13. An insect bait-and-switch delivery apparatus for the control of insects, comprising:

a reservoir defming a first chamber containing bait attractive to an insect and a second chamber containing active toxic to an insect;

a first feeding station in said first chamber for making bait available to an insect;

a second feeding station in said second chamber for making active available to an insect;

a passageway interconnecting said first and second chambers; and access means in said first chamber disposed to initially limit access of an insect to said second feeding station during an initial feeding period and to subsequently enable access to said second feeding station via said passageway after said initial feeding period wherein said access means comprises at least one port communicating between said first chamber and said passageway, and wherein the bait is a liquid, said first feeding station floats on the liquid bait, and said at least one port is located below a topmost level of said bait.

14. An insect bait-and-switch delivery apparatus for the control of insects, comprising:

a reservoir defining a first chamber and a second chamber, a first feeding station in said first chamber, a second feeding station in said second chamber, an access port in said reservoir permitting a target insect ingress to and egress from said first chamber;

a core member interconnecting said first and second chambers, said core member defining a passageway through which a target insect can move and including a first end opening into said first chamber and a second end opening into said second chamber;

a bait food source for said target insect lacking a substance toxic to said target insect and disposed in said first chamber at a level which initially covers the first end of said core member to prohibit access of the target insect to said passageway, and upon feeding the target insect depletes said bait until the first end of said core member is exposed to permit the target insect access to said passageway, wherein said bait is a liquid and said first feeding station floats on the liquid bait; and an active food source for said insect disposed in said second chamber and containing a substance toxic to said target insect.

15. The apparatus of claim 14 wherein said second chamber is disposed above said first chamber.

16. The apparatus of claim 2 wherein said core member comprises a centrally located, hollow tube.

17. A method of controlling insects, comprising the steps of:

(a) providing a bait-and-switch apparatus for initially delivering a bait food source and subsequently an active food source containing a substance toxic to target insects, wherein the apparatus comprises:

(i) a reservoir defining a first chamber containing the bait food source attractive to the insects and a second chamber containing the active food source toxic to the insects, said second chamber disposed above said first chamber;

(ii) a first feeding station in said first chamber for making the bait food source available to the insects;

(iii) a second feeding station in said second chamber for making the active food source available to the insects;

(iv) a passageway interconnecting said first and second chambers; and (v) access means in said first chamber, said access means communicating with said passageway and disposed below a topmost level of the bait food source in said first chamber so as to be initially inaccessible to the insects;

(b) allowing the target insects to enter the first chamber and feed on the bait food source for a sufficient amount of time to enable the target insects to become accustomed thereto;

(c) allowing the target insects to continue feeding on the bait food source until the bait food source is depleted to a level whereby the access means is exposed; and (d) permitting the target insects to travel to said second chamber via said passageway, to feed on the active food source, to return to the first chamber via said passageway, and to exit the first chamber.

18. The method of claim 17 wherein said access means comprises at least one port communicating between said first chamber and said passageway.

19. The method of claim 17 wherein the bait food source is selected from the group consisting of a liquid, a gel, a solid, a powder and a semisolid.

20. The method of claim 17 wherein the bait food source is a liquid and said first feeding station floats on the liquid bait.

21. The method of claim 17 wherein the active food source is selected from the group consisting of a liquid, a gel, a solid, a powder and a semisolid.

* * * * *

UNITED STATES PATENT AND TRADEMARK OFFICE
CERTIFICATE OF CORRECTION

PATENT NO.      : 6,189,259 B1
DATED           : February 20, 2001
INVENTOR(S)     : Douglas A. Soller It is certified that error appears in the above-identified patent and that said Letters Patent is hereby corrected as shown below:

Column 3,
Line 33, replace "defmed" with -- defined --.

Column 7,
Line 47, replace "cylindricallyshaped" with -- cylindrically-shaped --.

Column 8,
Line 26, replace "attatched" with -- attached --.
Line 27, replace "mployed" with -- employed --.

Column 9,
Line 18, replace "liquid a" with -- liquid, a --.
Line 27, replace "insect" with -- insect, --.
Line 35, after "and" insert -- access means in said first chamber disposed to initially limit access of an insect to --.
Line 51, replace "first chamber" with -- first chamber, --.

Column 10,
Line 61, replace "defming" with -- defining --.

Column 11,
Line 41, replace "claim 2" with -- claim 14 --.

Signed and Sealed this

Twenty-fifth Day of March, 2003

JAMES E. ROGAN
*Director of the United States Patent and Trademark Office*